United States Patent

[11] 3,571,763

[72] Inventor Kurt H. Haase
Watertown, Mass.
[21] Appl. No. 702,890
[22] Filed Feb. 5, 1968
[45] Patented Mar. 23, 1971
[73] Assignee The United States of America as represented by the Secretary of the Air Force

[54] IMMITTANCE NETWORK INCORPORATING ONE NEGATIVE RESISTANCE
6 Claims, 9 Drawing Figs.

[52] U.S. Cl. .......... 333/24, 333/70, 333/80
[51] Int. Cl. .......... H03h 5/12, H03h 7/14
[50] Field of Search .......... 333/80, 80 (T)

[56] References Cited

OTHER REFERENCES

Weinberg, L., " Network Analysis and Synthesis" McGraw Hill, 1962, TK 3226 W4 pp 431—442

*Primary Examiner*—Herman Karl Saalbach
*Assistant Examiner*—Wm. N. Punter
*Attorneys*—Harry A. Herbert, Jr. and Julian L. Siegel

ABSTRACT: Circuits realizing decomposable bi-order-*n* impedance and admittance functions in which the impedance function is realized by a single tee section terminated in a positive impedance and has a series positive and negative branch resistance and a shunt positive resistance and positive impedance interposed between the series branch elements. The admittance function is realized by a pi section terminated in a positive admittance having a series branch composed of the parallel combination of a positive conductance and a positive admittance and having two shunt branches, one being a positive resistance and the other a negative resistance.

IMPEDANCE CIRCUIT

IMPEDANCE CIRCUIT

ADMITTANCE CIRCUIT

IMPEDANCE CIRCUIT

ADMITTANCE CIRCUIT

IMPEDANCE CIRCUIT

INVENTOR.
KURT H. HAASE
BY Harry A. Herbert Jr and
Julian L. Siegel
ATTORNEYS

IMMITTANCE NETWORK INCORPORATING ONE NEGATIVE RESISTANCE

BACKGROUND OF THE INVENTION

This invention relates to a driving point immittance network and more particularly to a one port network that is a canonical circuit representing a positive real bi-order-*n* immittance function in which resistance is the only negative element.

In my previously filed application, now issued U.S. Pat. No. 3,479,618, there was disclosed a network realizing the bi-order-*n* immittance function $$F(s)=\frac{s^n+N_{n-1}s^{n-1}+\ldots+N_1s+N_0}{s^n+D_{n-1}s^{n-1}+\ldots+D_1s+D_0} \qquad (1)$$

which uses negative impedance whereas the present invention is a circuit utilizing negative resistance which has the advantage in that the negative element is not dependent upon frequency.

A novel technique is presented to realize an immittance function presented by the analytical expression of Equation (1). The term "immittance" is of a neutral character and can be deliberately interpreted as "impedance" or "admittance." Since a canonical network is presented, the least amount of space and weight is required, which is advantageous in many applications.

SUMMARY OF THE INVENTION

A bi-order-*n* function is $$F(s)=\frac{s^n+N_{n-1}s^{n-1}+\ldots+N_1s+N_0}{s^n+D_{n-1}s^{n-1}+\ldots+D_1s+D_0} \qquad (1)$$

where two polynomials of the same even order *n* are divided. If $F(s)$ is positive real, then in general none of the coefficients $N_i$ and $D_i$ in the sequence $0\leq i\leq n-1$ is missing. The necessary and sufficient conditions for positive realness of $F(s)$ are well known and are referred to by Otto Brune in the "Journal of Mathematics and Physics," Volume 10, *pp* 191—236, Aug. 1931.

The present invention is mainly concerned with two circuits, one in terms of impedance and the other in terms of admittance. Both circuits have the same driving point immittance $\bar{F}(s)$ and are dual in the sense that the impedance circuit has the driving point impedance $\bar{Z}(s)=(s)$ and the admittance circuit has the driving point admittance $\bar{\Gamma}(s)=\bar{F}(s)$ and both circuits use negative resistances.

The function of $\bar{F}(s)$ is $$\bar{F}(s)=\frac{s^n+\bar{N}_{n-1}s^{n-1}+\ldots+\bar{N}_1s+\bar{N}_0}{s^n+\bar{D}_{n-1}s^{n-1}+\ldots+\bar{D}_1s+D_0} \qquad (2)$$

The only difference between Equation (2) and Equation (1) is the use of bars over the capital letters. By this means we indicate that $\bar{F}(s)$ is a particular bi-order-*n* function further referred to as a "decomposable bi-order-*n* function." It can be obtained from any positive real bi-order-*n* function $F(s)$ according to $\bar{F}=F(s)-K[F_m(s)]$. (3)
where $F(s)$ and $\bar{F}(s)$ are of the same rank $2n$ (both are bi-order-*n* functions), $F_m(s)$ is a "suitable" positive real function, and $K$ is a positive constant that normalizes $\bar{F}(s)$.

It is therefore an object to provide a novel canonical driving-point network.

It is another object to provide a canonical driving-point network that represents a bi-order-*n* function.

It is still another object to provide a driving-point network representing a bi-order-*n* function in terms of impedances and admittances where negative elements are resistive.

BRIEF DESCRIPTION OF THE DRAWINGS

FIGS. 6A and 6B show the circuit elements that can be used when the circuit is represented in terms of impedances; and FIGS. 7A and 7B show the circuit elements that can be used when the circuit is represented in terms of admittances.

DESCRIPTION OF THE PREFERRED EMBODIMENTS

The present invention is a network that has a driving-point immittance function $$\bar{F}(s)=\frac{s^n+\bar{N}_{n-1}s^{n-1}+\ldots+\bar{N}_1s+\bar{N}_0}{s^n+\bar{D}_{n-1}s^{n-1}+\ldots+\bar{D}_1s+\bar{D}_0} \qquad (2)$$

Figure 1:
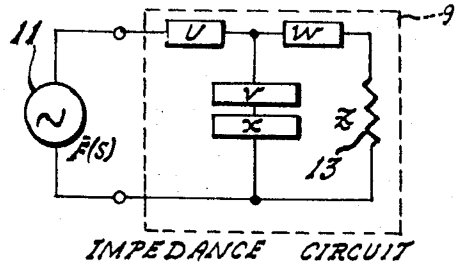
FIG. 1 PRIOR ART
FIG. 1 is a circuit diagram of a canonical one port network using negative impedance.
Figure 2:
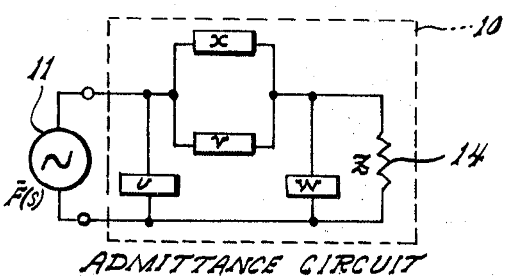
FIG. 2 PRIOR ART
FIG. 2 is a circuit diagram of a canonical one port network using negative admittance.

In my previously filed application, the network shown in FIGS. 1 and 2 was described. Necessarily in these circuits the immittance *W* is negative in both circuits.

The circuits of FIG. 1 and FIG. 2 have the driving-point impedance $\bar{F}(s)$. Both circuits are dual in the sense that the circuit of FIG. 1 has a driving-point impedance $\bar{Z}(s)=\bar{F}(s)$ and the circuit of FIG. 2 has the driving-point admittance of $\bar{\Gamma}(s)=\bar{F}(s)$: Because of this duality, the discussion is mainly with reference to the circuit of FIG. 1 but everything holds true for the dual circuit of FIG. 2.

Shown in FIG. 1 is impedance network 9 having a single T section that is terminated with resistance 13 and of magnitude $Z=z$ (4)

where *z* is the positive constant and the network is driven by source 11. The T has series branch impedances *U* and *W*, where *U* is a positive and *W* is a negative impedance. The T also has a shunt branch that is composed of positive impedances *V* and *X* and has the driving-point impedance $\bar{Z}(s)=\bar{F}(s)$.

Shown in FIG. 2 is admittance network 10 having a single pi section that is terminated with conductance 14 of the magnitude $Z=z$ where *z* is again a positive constant and the network is driven by source 11. The pi has shunt branch admittances *U* and *W*, where *U* is a positive and *W* is a negative admittance and has a series branch that is composed of positive admittances *V* and *X*. The pi circuit has the driving-point impedance $\bar{\Gamma}(s)=\bar{F}(s)$.

Let $U=v(\underline{n}-1)\Phi(s)=u\Phi(s)$ (5*a*)

$V=v\Phi(s)$ (5*b*)

$W=-v(\underline{n}-1)\Phi(s)/\underline{n}=w\Phi(s)$ (5*c*)

where *v* is positive, $\underline{n}$ also positive and greater than 1, then $1/u+1/v+1/w=0$ (6)

and $u=v(\underline{n}-1)$ is positive and $w=-v(\underline{n}-1)/\underline{n}$ is negative. Hence *W* is negative. Let $\Phi(s)$ be a normalized and positive real function of the kind $$\phi(s)=s\,\frac{s^m+a_{m-1}s^{m-1}+\ldots+a_1s+a_0}{s^m+b_{m-1}s^{m-1}+\ldots+b_1s+b_0}=s\,\frac{a(s)}{b(s)} \qquad (7)$$

In equation (7) the order *m* is any integer 1, 2, ... *m*. Let $$X=x\ \Phi(s) \qquad (8)$$

where *x* is a positive constant and $\Phi(s)$ is a positive real and normalized function of the same rank as $\Phi(s)$, but of the form $$\Phi(s)=\frac{s^m+\beta_{m-1}s^{m-1}+\ldots+\beta_1s+\beta_0}{s(s^m+\alpha_{m-1}s^{m-1}+\ldots+\alpha_1s+\alpha_0)}=\frac{\beta(s)}{s\alpha(s)} \qquad (9)$$

The driving-point immittances of the circuits in FIGS. 1 and 2 are $$F(s)=\frac{(UV+UW+VW)+(U+W)X+(U+V)Z+XZ}{V+W+X+Z} \qquad (10)$$

But by Equation (6)

$UV+UW+VW=0.$ (11)

Substituting the results in Equations (2) and (9) we obtain therefore $$\overline{F}(s)=\frac{s^2a(s)\alpha(s)+x(\underline{n}-1)^2sa(s)\beta(s)+xb(s)\beta(s)/vn}{s^2a(s)\alpha(s)+sb(s)\alpha(s)/v\underline{n}+xn\underline{b}(s)\beta(s)/v}$$

where $$z\underline{n}^2=1. \text{ or } \underline{n}=\sqrt{\frac{1}{z}} \quad (13)$$

The highest power of $s=\sigma+jw$ in the numerator and the denominator of Equation (12) is $2m+2$ since $a(s)$ and $\alpha(s)$ are both polynomials of the order $m$.

The immittances $U$, $V$, and $W$ imply the same function $$\phi(s)=s\frac{a(s)}{b(s)} \quad (14)$$

and $x$ implies $$\Phi(s)=\frac{\beta(s)}{s\alpha(s)} \quad (14a)$$

$a(s)$, $b(s)$, $\alpha(s)$ and $\beta(s)$ are normalized polynomials of the order $m$ (any integer) and $n=2m+2.$ (15)

The $v$, $x$, and $\underline{n}>1$ in Equation (12) are positive constants which can be computed for $\overline{F}(s)$ given in the form of Equation (2). Also the functions $\phi(s)$ and $\Phi(s)$ can be computed so that the circuit in FIG. 1 for the impedance interpretation of $\overline{F}(s)$ and/or the circuit in FIG. 2 for the admittance interpretation can be constructed.

When $m=1$, the following circuit elements are applicable. The impedance circuit implying the function $\phi(s)$ which equals $$s\cdot\frac{s+a}{s+b}$$

is shown in FIG. 6A. This circuit comprises inductor 31 in series with the parallel combination of inductor 33 and resistor 35. The impedance circuit implying $$\Phi(s)=\frac{1}{s}\cdot\frac{s+\beta}{s+\alpha}$$

is shown in FIG. 6B. The circuit comprises capacitor 41 in parallel with the series combination of capacitor 37 and resistor 39. The admittance circuit implying the function $$\phi(s)=\frac{s}{i}\cdot\frac{s+a}{s+b}$$

is shown in FIG. 7A in which capacitor 47 is in parallel with the series combination of capacitor 43 and resistor 45. The admittance function implying $$\Phi(s)=\frac{1}{s}\cdot\frac{s+\beta}{s+\alpha}$$

is shown in FIG. 7B, which comprises inductor 49 in series with the parallel combination of inductor 51 and resistor 53.

The following transformation of the expression on the right side of Equation (12) is now performed; new constants $x'$, $n'$, $z'$ and $R'_r$ are introduced. $a(s)$, $b(s)$, $\alpha(s)$, and $\beta(s)$ remain, and the following is obtained:

$$\overline{F}(s)=\frac{s^2a(s)\alpha(s)+x'sa(s)\beta(s)+x'(\underline{n}'-1)b(s)\beta(s)/z'n'^2}{s^2a(s)\alpha(s)+s\alpha(s)b(s)/\underline{n}'^2z'+x'b(s)\beta(s)/z'} \quad (16)$$

and postulate $R'_r\underline{n}'=1.$ (16a)

Then Equations (16), (12), and (16a) and (13) can be compared in their coefficients and we obtain:

$x'=x(\underline{n}-1)^2,$ (17)

$\underline{n}'^2=\underline{n}^2/(\underline{n}-1)^2,$ (18)

$\underline{n}'=\underline{n}/(\underline{n}-1)$ (18a)

$z'=(\underline{n}-1)^2v/in,$ (19)

$R'_r=1-/\underline{n}.$ (20)

Figure 3:
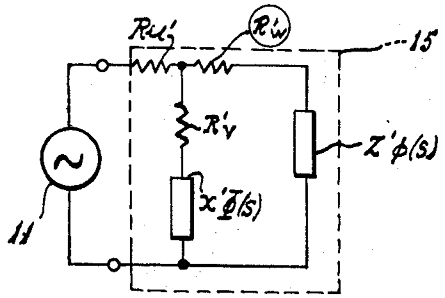
FIG. 3 shows an embodiment of an invention in which a canonical one port network uses a negative resistance.
Figure 4:
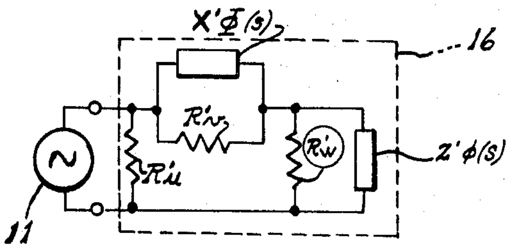
FIG. 4 shows the second embodiment of the invention in which a canonical one port network uses a negative conductance.

Instead of the circuits in FIGS. 1 and 2 we now obtain impedance circuit 15 and admittance circuit 16 shown in FIGS. 3 and 4 respectively. They have the same driving-point immittances. The immittances $X$ and $x'\Phi(s)$ imply the same frequency function $\Phi(s)$, only the positive constants are different; they are $x$ in FIG. 1 and $x'$ in FIG. 3. The immittances $U$, $V$, $W$ in FIG. 1 and $z'\Phi(s)$ in FIG. 3 imply the same frequency function $\Phi(s)$, only the constants are different. There is only one such immittance in the circuit in FIG. 3 and the negative immittance in FIG. 1 disappears completely. Instead, the circuit in FIG. 3 implies three resistances $$R_u'=R_v'(\underline{n}'-1)=\frac{1}{\underline{n}} \quad (21a)$$

$$R_w'=-R_v'(\underline{n}'-1)/\underline{n}'=-\frac{n-1}{\underline{n}^2} \quad (21b)$$

and $R'_r$ is given by Equation (20).

Figure 5:
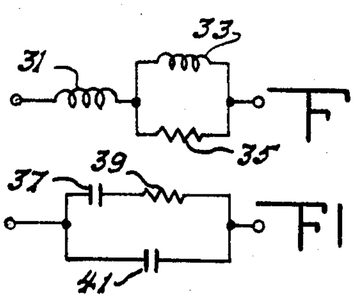
FIG. 5 shows a variation of that network shown in FIG. 3.
Figure 5:
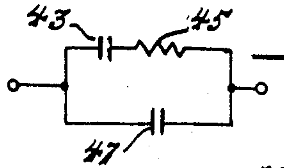
Figure 5:
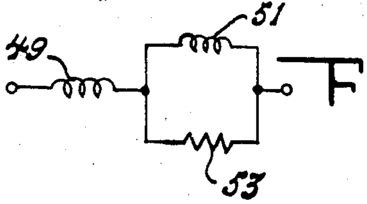
Figure 5:
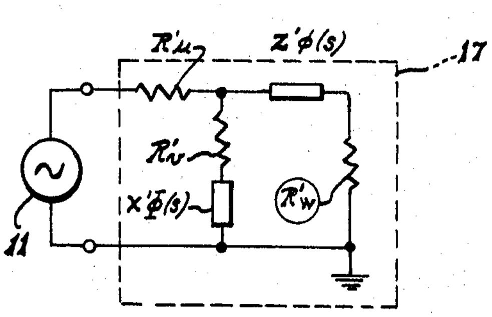

In FIG. 1, $U$, $V$ and $W$ imply the frequency function $\varphi$; $X$ implies $\Phi$; and $Z$ implies a dummy function, $Z=z$. If we interchange the frequency function $\varphi$ with a dummy function, and leave $\Phi$ as it is, then FIG. 3 is obtained where the dummy function is implied. $R'_v$, $R'_u$ and $R'_w$ are implied in the termination and $\varphi$ remains the same. The driving point impedance remains in variant provided the prime constants have been calculated according to equations (17) to (20). The resistance $R'_w$ is negative since $\underline{n}'>1$. It can be realized in any way that realizes a negative resistance; for instance, as in the form of a tunnel-diode. It is an essential feature that the elements in the circuit be arranged such that the negative resistance is at ground level, which is shown in impedance circuit 17 of FIG. 5 which is essentially identical with FIG. 3. FIGS. 2 and 4 are dual circuits of that shown in FIGS. 1 and 3 and the concept of duality applies.

I claim:

1. A one port impedance network representing the bi-order-$n$ function $$F(s)=\frac{s^n+\overline{N}_{n-1}s^{n-1}+\ldots+\overline{N}_1s+\overline{N}_0}{s^n+\overline{D}_{n-1}s^{n-1}+\ldots+\overline{D}_1s+\overline{D}_0}$$

the network comprising:

a. a driving source having first and second terminals;

b. a first positive resistance connected to the first terminal of the driving source and equal to $1/\underline{n}$ where $n$ equals the square root of the reciprocal of the magnitude of the terminating resistance;

c. a negative resistance equal to $$\frac{-(\underline{n}-1)}{n^2}$$

connected to the first positive resistance;

d. a second positive resistance equal to $$\left[1-\frac{1}{n}\right]1-\frac{1}{\underline{n}}$$

connected to the junction of the first positive resistance and the negative resistance;

e. a first impedance equal to $x'\Phi(s)$ having a series connection with a second positive resistance and the second terminal of the driving source; and f. a second impedance equal to $z'\Phi(s)$ terminating the network in series with the negative impedance and in parallel with the second positive resistance and the first impedance where $x'=x(\underline{n}-1)^2$, $z'=(\underline{n}-1)^2v/\underline{n}$, and $\left[\frac{1}{u}+\frac{1}{v}+\frac{1}{w}=0\right]$ $v$ is defined implicitly by $\frac{1}{u}+\frac{1}{v}+\frac{1}{w}=0$ where $u=v(\underline{n}-1)$ and $w=-v\,\dfrac{(n-1)}{\underline{n}}$ 2. A one port impedance network according to claim 1 wherein $\Phi(s)$ comprises:

a. a first inductor; and b. a parallel combination including a second inductor and a resistor in series connection with the first inductor.

3. A one port impedance network according to claim 1 wherein $\Phi(s)$ comprises:

a. a first capacitor; and b. a series combination including a second capacitor and a resistor in parallel connection with the first capacitor.

4. A one port admittance network representing the bi-order-$n$ function $$F(s)=\frac{s^n+N_{n-1}s^{n-1}+\ldots+N_1s+N_0}{s^n+D_{n-1}s^{n-1}+\ldots+D_1s+D_0}$$

the network comprising:

a. a driving source having first and second terminals;

b. a first positive conductance equal to $1/\underline{n}$ in parallel connection with the driving source where $\underline{n}$ is equal to the square root of the reciprocal of the magnitude of the terminating conductance;

c. the parallel combination including a first positive admittance equal to $x'\Phi(s)$ and a second positive conductance equal to $$1-\frac{1}{\underline{n}}$$

the parallel combination being connected to the first terminal of the driving source;

d. a negative conductance equal to $$\left[\underline{n}-\frac{1}{2}\right]\frac{-(\underline{n}-1)}{\underline{n}^2}$$

and connected to the parallel combination and the second terminal of the driving source; and e. a second admittance equal to $z'\Phi(s)$ terminating the network and in parallel connection with the negative conductance where $$x'=x(\underline{n}-1)^2,\ z'=(\underline{n}-1)^2\frac{v}{n},\text{ and}$$

$$\left[\frac{1}{u}+\frac{1}{v}+\frac{1}{w}=0\right] v \text{ is defined implicitly by}$$

$$\frac{1}{u}+\frac{1}{v}+\frac{1}{w}=0 \text{ where } u=v(\underline{n}-1) \text{ and}$$

$$w=-v\frac{(n-1)}{\underline{n}}$$

5. A one port admittance network according to claim 4 wherein $\Phi(s)$ comprises:

a. a first capacitor; and b. a series combination including a second capacitor and a resistor in parallel connection with the first capacitor.

6. A one port admittance network according to claim 4 wherein $\Phi(s)$ comprises:

a. a first inductor; and b. a parallel combination including a second inductor and a resistor in series connection with the first inductor.